United States Patent

Asamizuya

[19]

[11] Patent Number: 5,917,538
[45] Date of Patent: Jun. 29, 1999

[54] DATA TRANSMISSION APPARATUS OF VIDEO-ON-DEMAND OR NEAR VIDEO-ON-DEMAND SYSTEM

[75] Inventor: Noboru Asamizuya, Tokyo, Japan

[73] Assignee: Sony Corporation, Tokyo, Japan

[21] Appl. No.: 09/083,782

[22] Filed: May 22, 1998

Related U.S. Application Data

[63] Continuation of application No. 08/646,274, filed as application No. PCT/JP95/01855, Sep. 18, 1995.

[30] Foreign Application Priority Data

Sep. 16, 1994 [JP] Japan ..................................... 6-222250

[51] Int. Cl.$^6$ ........................................................ H04N 7/10
[52] U.S. Cl. .......................... 348/7; 345/328; 395/200.49
[58] Field of Search ................................ 348/7, 714, 407, 348/390; 345/327, 328; 395/200.49; 358/261.1

[56] References Cited

U.S. PATENT DOCUMENTS 5,576,765   11/1996   Cheney et al. ........................... 348/407

Primary Examiner—Victor R. Kostak
Attorney, Agent, or Firm—Frommer Lawrence & Haug, LLP; William S. Frommer

[57] ABSTRACT

A data transmission apparatus suitable for use in a VOD system which can send program data in response to requests made at any time. In the data transmission apparatus of the present invention, a series of data is read from a mass storage at a high speed referring to a data recording table in which are recorded the head address and magnitude of the series of data which are to be simultaneously read and the magnitudes of the individual data. For the read data, the magnitudes of individual data of the table are referred to, separated to individual data, and recorded in the buffer memory ($33_{-1}$ to $33_{-n}$) for every output channel. The data is appropriately processed and transmitted for every channel by the buffer memory controllers ($32_{-1}$ to $32_{-n}$) provided for every output channel and output controllers ($35_{-1}$ to $35_{-n}$) and formatter. By this, it is possible to provide a data transmission apparatus in which desired data can be transmitted from the recording apparatus in which individual data are recorded with a variable data rate in parallel at a high speed, a variety of programs can be recorded with a good efficiency, and no deterioration occurs in the picture.

11 Claims, 15 Drawing Sheets

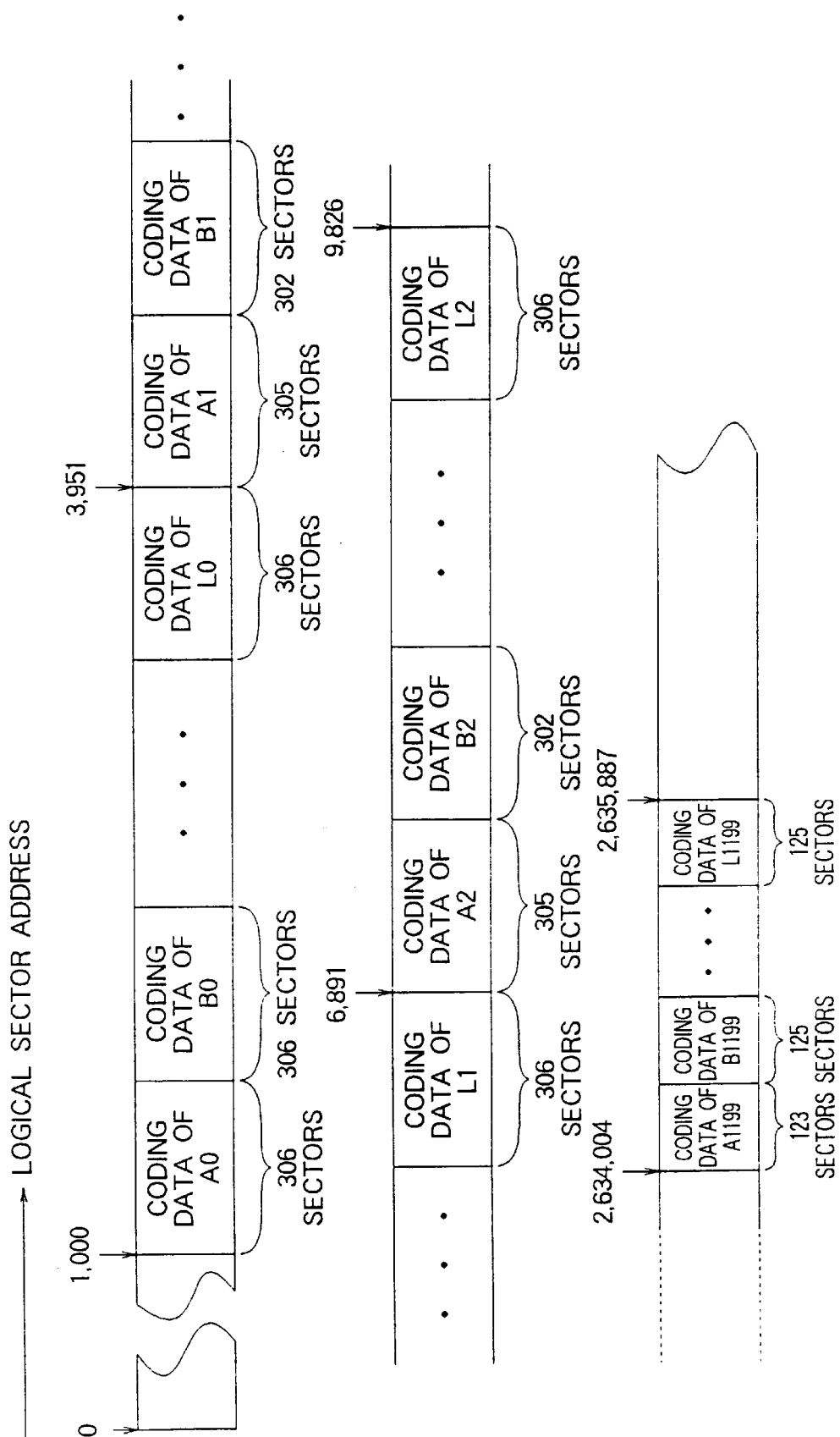

FIG. 7

| ITEM \ BLOCK | 0 | 1 | 2 | | 1199 |
|---|---|---|---|---|---|
| START LOGICAL SECTOR ADDRESS | 1,000 | 3,951 | 6,891 | | 2,634,004 |
| TOTAL NUMBER OF SECTORS OF Ai TO Li | 2,951 | 2,940 | 2,935 | | 1873 |
| NUMBER OF SECTORS OF Ai | 306 | 305 | 305 | | 123 |
| NUMBER OF SECTORS OF Bi | 306 | 304 | 302 | | 125 |
| | | | | | |
| NUMBER OF SECTOR OF Li | 306 | 306 | 306 | | 125 |
| CODE AMOUNT OF Ai [bit] | 2,500,000 | 2,497,000 | 2,993,000 | | 1,003,000 |
| CODE AMOUNT OF Bi [bit] | 2,500,000 | 2,483,000 | 2,467,000 | | 1,017,000 |
| | | | | | |
| CODE AMOUNT OF Li [bit] | 2,500,000 | 2,500,000 | 2,500,000 | | 1,017,000 |

FIG. 9

| BLOCK PROGRAM | 0 | 1 | 2 | 3 | 4 | 5 | 6 | 7 | 8 | ... | 1198 | 1199 |
|---|---|---|---|---|---|---|---|---|---|---|---|---|
| A | 2.500 | 2.497 | 2.493 | 2.490 | 2.487 | 2.483 | 2.480 | 2.477 | 2.473 | ... | 1.007 | 1.003 |
| B | 2.500 | 2.483 | 2.467 | 2.450 | 2.433 | 2.417 | 2.400 | 2.383 | 2.367 | ... | 1.033 | 1.017 |
| ... | ... | ... | ... | ... | ... | ... | ... | ... | ... | ... | ... | ... |
| L | 2.500 | 2.500 | 2.500 | 2.500 | 2.500 | 2.500 | 2.500 | 2.500 | 2.500 | ... | 1.033 | 1.017 |

UNIT : Mbit

FIG. 10

UNIT : SECTOR = (1024Byte)

| PROGRAM \ BLOCK | 0 | 1 | 2 | 3 | 4 | 5 | 6 | 7 | 8 | ... | 1198 | 1199 |
|---|---|---|---|---|---|---|---|---|---|---|---|---|
| A | 306 | 305 | 305 | 305 | 304 | 304 | 303 | 303 | 303 | ... | 123 | 123 |
| B | 306 | 304 | 302 | 300 | 297 | 296 | 293 | 291 | 289 | ... | 127 | 125 |
| ... | | | | | | | | | | | | |
| L | 306 | 306 | 306 | 306 | 306 | 306 | 306 | 306 | 306 | ... | 127 | 125 |

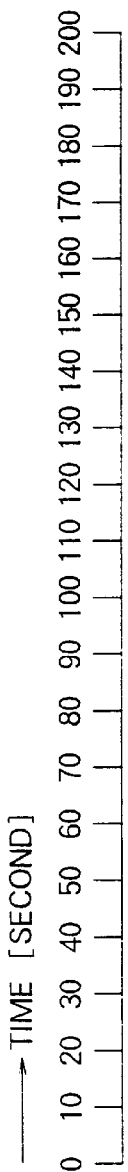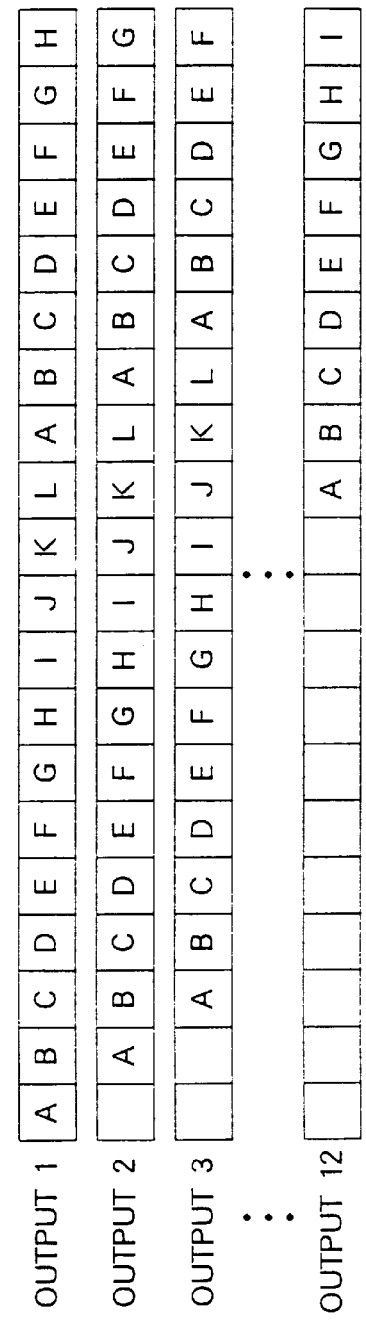
FIG. 13A
FIG. 13B

DATA TRANSMISSION APPARATUS OF VIDEO-ON-DEMAND OR NEAR VIDEO-ON-DEMAND SYSTEM

This is a continuation of application Ser. No. 08/646,274, filed Jan. 10, 1997, now U.S. Pat. No. 5,793,412 which is a 371 of PCT/JP95/01855, filed Sep. 18, 1995.

TECHNICAL FIELD

The present invention relates to a data transmission apparatus which is suitably used in a video-on-demand or other apparatus which can send video data in response to demand at any time.

BACKGROUND ART

Realization of a practical video-on-demand (VOD) system which can instantly provides program data in response to a demand of a receiver has been desired. A VOD system able to individually respond to demands made at all times, however, requires an extremely large sized data transmission apparatus which performs complex processing.

Accordingly, a near-video-on-demand (NVOD) system which can simplify the configuration of the data transmission apparatus while realizing a function similar to that of a VOD system has been proposed. An NVOD system is a system that transmits program data to a plurality of channels at predetermined time intervals. It selects the channels for the programs starting from the next time zone or time period in response to requests made in a certain time zone and then provides those programs.

Even in an NVOD system, however, it is necessary to simultaneously reproduce a plurality of series of program data to be transmitted to a plurality of channels, so there is a desire that the reproduction of the plurality of series of program data be carried out by a simpler apparatus and by a more efficient method.

As a fundamental method of generating a plurality of series of program data, there is the method of providing a separate reproducing apparatus for each of the channels and transmitting the data to the plurality of channels by these. Further, in recent years, hard disc devices, magneto-optic disc devices, and other randomly accessible recording apparatuses which have large capacities and can perform high speed access have been realized. An NVOD system which records video data etc. in these recording apparatuses and transmits the data to the plurality of channels in a time division manner is disclosed in Japanese Patent Application No. 5-328349 previously filed by the present applicant.

Further, the present applicant has proposed in Japanese Patent Application No. 6-137018 an NVOD system with a method of recording data wherein continuous regions are read so as to read the data and transmit the data to a plurality of channels at a speed as high as possible.

In such a data transmission apparatus, however, to perform high speed access and to facilitate the control as much as possible, the data has been encoded with a predetermined fixed data rate. As a result, the encoding at the fixed compression rate is carried out even with respect to data that can be encoded with a higher compression rate than the fixed data rate, so there is a problem that the programs cannot be efficiently stored. Further, with respect to data for which encoding at a fixed compression rate is difficult, conversely the encoding is forcibly carried out at that fixed compression rate, so there is a problem that the quality of the picture and sound when reconstructing the data is deteriorated.

DISCLOSURE OF THE INVENTION

An object of the present invention is to provide a data transmission apparatus using a recording apparatus recording video data, audio data, and other data encoded at a variable data rate suited to the respective data, reading the data at a high speed from that recording apparatus, and able to almost simultaneously transmit data to a plurality of channels in response to demand. Further, another object is to provide a data transmission apparatus which can store a variety of data with a high efficiency and does not cause a deterioration of quality when reconstructing the data.

When accessing a recording medium in which data is recorded at a variable data rate, the access must be carried out while checking the magnitude of the data and the head position of the data, so the access per second cannot be carried out at a high speed. Accordingly, if direct decision of the divisions of the data etc. without having to perform computations and other processing each time were made possible, access of data at a speed similar to that of data of a fixed length would become possible even for data of a variable length.

Accordingly, the data transmission apparatus of the present invention comprises a data recording means for recording on a recording medium a plurality of divided time series data, formed by dividing the time series data for every predetermined time zone and applying variable length coding, in sequential order in accordance with the time zones; a table storing means for storing at least a table including data length information indicating the data length of each of the divided time series data and recording address information indicating a first recording address of the divided time series data in the data recording means; and an output means for sequentially outputting the divided time series data in predetermined fixed time units based on the data length information and the recording address information stored in the table storing means.

Specifically, the time series data is video data.

Alternatively, specifically, the data recording means and the table storing means store the data and the table in different recording regions of the same recording medium.

Alternatively, the data transmission apparatus of the present invention comprises a data recording means for recording on a recording medium a plurality of divided time series data, formed by dividing a plurality of time series data for every predetermined time zone and applying variable length coding, in order in accordance with the time zones of the plurality of divided time series data of each time series data, respectively; a table storing means for storing at least a table including data length information indicating the data length of each of the divided time series data and recording address information indicating the first recording address of at least one divided time series data in the data recording means; a plurality of output channels; and an output means for sequentially outputting the divided time series data from one of the plurality of output channels in predetermined fixed time units based on the data length information and the recording address information stored in the table storing means.

Preferably, the plurality of time series data have a mutual relationship in time series, the output means sequentially outputs the plurality of time series data from each of the output channels in a predetermined order by sequentially outputting a plurality of divided time series data constituting the plurality of time series data from each of the output channels in the predetermined order.

Alternatively, preferably, the plurality of time series data have a mutual relationship in time series and, each time series data corresponds to one of the output channels, and the output means sequentially outputs a plurality of divided time series data constituting each time series data from each corresponding output channel in a predetermined order.

Alternatively, preferably, the data recording means records each divided time series data of the same time zone among the plurality of time series data in the recording medium so that they are physically continuous.

Alternatively, preferably, the data recording means continuously records each of the divided time series data of the same time zone among the plurality of time series data in recording regions from which the data can be read in a lump on a randomly accessible recording medium.

Specifically, the time series data is video data.

Alternatively, specifically, the output means has a data reading means for reading from the data recording means each of the divided time series data by identifying the same for every time zone based on the data length information and the recording address information stored in the table storing means; a plurality of buffer memories which are provided corresponding to the time series data for storing each of the divided time series data read by the data reading means, respectively; and a control means for controlling the output of the data from the plurality of buffer memories to the plurality of output channels.

Specifically, the data recording means and the table storing means store the data and the table in different recording regions of the same recording medium.

BRIEF DESCRIPTION OF THE DRAWINGS

The above object and features of the present invention will become more apparent from the following description with reference to the accompanying drawings, wherein:

FIG. 6 is a view of a state of recording of the program data to a mass storage;

FIG. 7 is a view of the data recording table;

FIG. 9 is a view of the amount of codes for each program;

FIG. 10 is a view of the number of sectors for each program;

FIG. 13A is a view of the state that different programs are transmitted;

FIG. 13B is a view of the state that the same program is transmitted deviated by 10 minutes each;

BEST MODE FOR CARRYING OUT THE INVENTION

First embodiment

A first embodiment of the data transmission apparatus of the present invention will be explained by referring to FIG. 1 to FIG. 13.

The data transmission apparatus of the first embodiment is a data transmission apparatus which is used for the transmission of data in an NVOD system and transmits a program so that the program can be received by a receiver which requests the reception of the program from substantially the time of the request.

Figure 1:
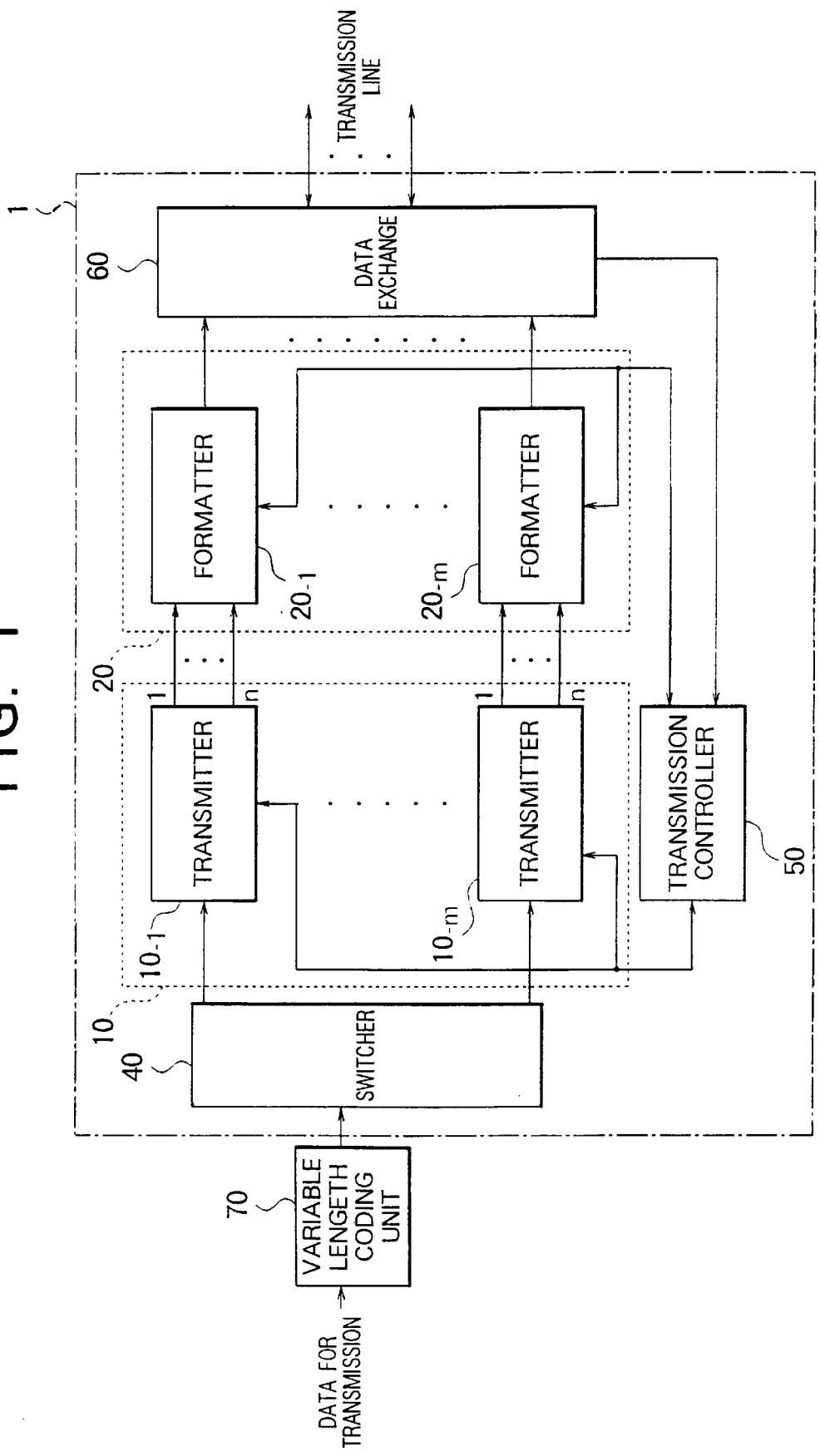
FIG. 1 is a view of the configuration of a data transmission apparatus according to the present invention.

FIG. 1 is a view of the configuration of the first embodiment of the data transmission apparatus of the present invention.

The data transmission apparatus 1 has a switcher 40, a transmission unit 10, a formatter unit 20, a data exchange 60, and a transmission controller 50. Note that the data transmission apparatus 1 receives as input data subjected to variable length coding by a variable length coding unit 70.

First, the operations of the different portions constituting the data transmission apparatus 1 will be briefly explained referring to FIG. 1.

The switcher 40 inputs the program data for transmission, output from a not illustrated program library and subjected to variable length coding by the variable length coding unit 70, to one of $m$ number of transmitters $10_{-1}$ to $10_{-m}$. The program library has recorded in it a plurality of program data which can be provided.

The transmission unit 10 is constituted by $m$ number of transmitters $10_{-1}$ to $10_{-m}$, each of the transmitters $10_{-1}$ to $10_{-m}$ having $n$ number of output channels. The configuration of the transmitters $10_{-1}$ to $10_{-m}$, will be explained later.

The formatter unit 20 is constituted by $m$ number of formatters $20_{-1}$ to $20_{-m}$ corresponding to the transmitters $10_{-1}$ to $10_{-m}$. Each formatter $20_{-1}$ (i=1 to m) adds to the output data from the channels of the transmission unit 10 a header such as the destination information to the receiver which had requested the data, constructs an ATM cell for transferring the data by the ATM (a synchronous transfer mode), multiplexes a large number of ATM cells, and then outputs the same to the data exchange 60.

The data exchange 60 is connected to a variety of transmission lines and transmits the data from the data transmission apparatus 1.

The transmission controller 50 controls the transmission unit 10, the formatter unit 20, and the data exchange 60 to make them perform the transfer of the program data to the transmission unit 10 via the variable length coding unit 70 and the switcher 40, the transfer of the program data from the transmission unit 10 to the formatter unit 20, the transmission of the program data to the origin of the request, etc. at desired timings.

Next, an explanation will be made of the configuration of the transmission unit 10 by referring to FIG. 2 and FIG. 3.

The transmission unit 10 is constituted by n number of transmitters $10_{-1}$ to $10_{-n}$.

Figure 2:
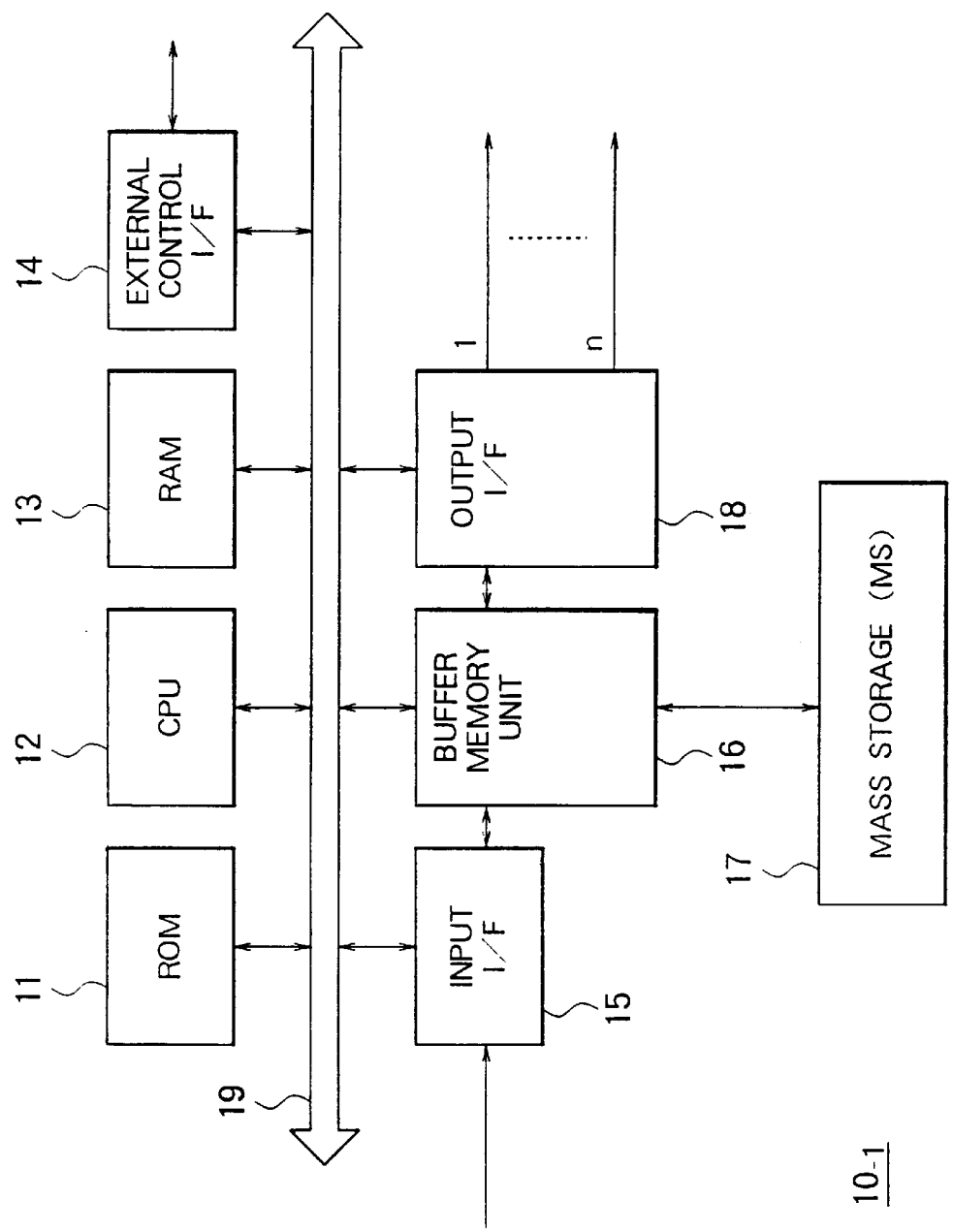
FIG. 2 is a view of the configuration of a transmitter of the data transmission apparatus shown in FIG. 1.

FIG. 2 is a view of the configuration of a transmission unit $10_{-1}$ (i=1 to n).

Figure 3:
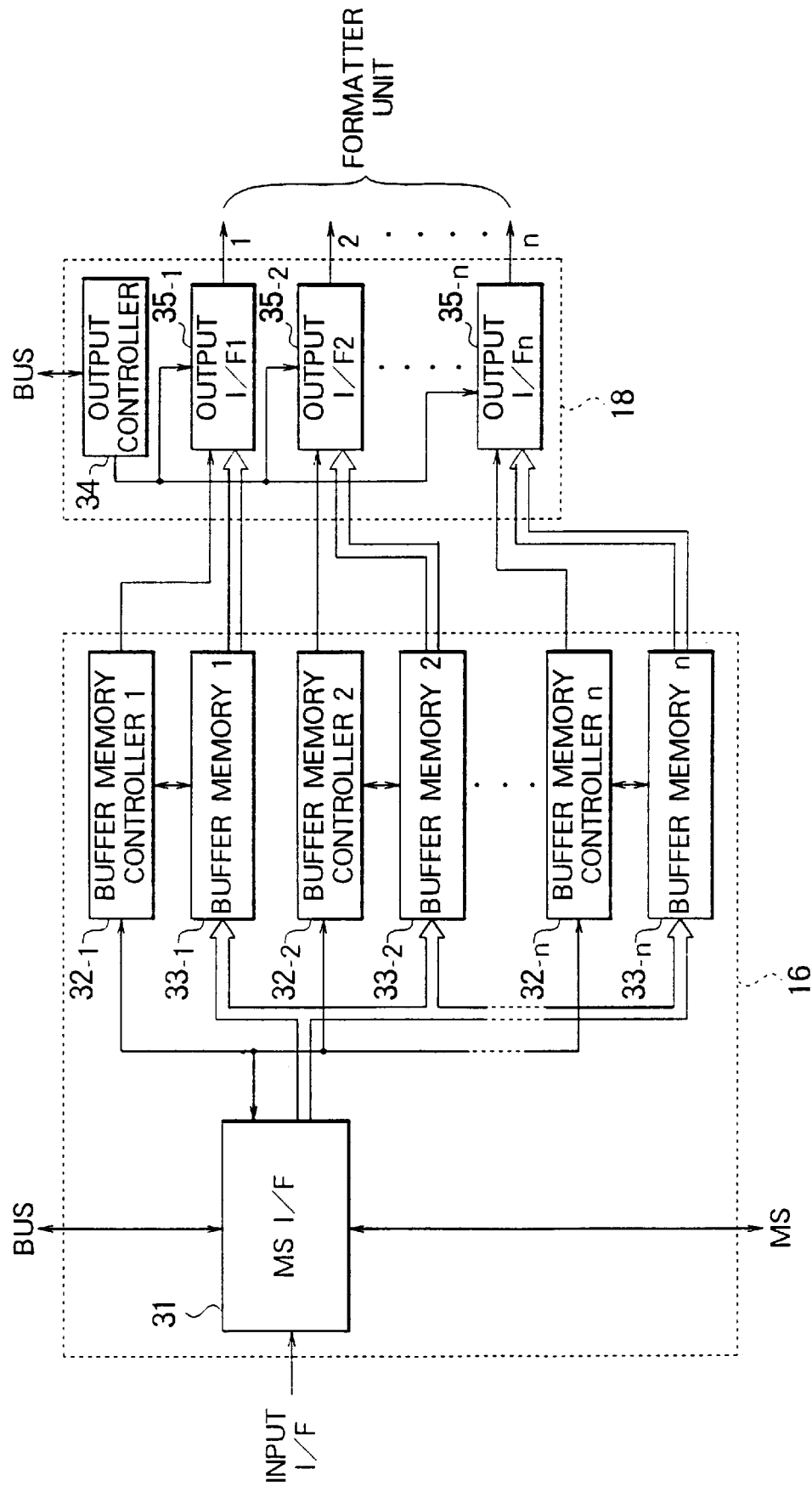
FIG. 3 is a view of the configuration of a buffer memory and an output interface of the transmitter shown in FIG. 2.

FIG. 3 is a view explaining the configuration of a buffer memory unit 16 and an output interface 18 shown in FIG. 2.

The transmission unit 10 has a ROM 11, a CPU 12, a RAM 13, an external control interface 14, an input interface 15, a buffer memory unit 16, a mass storage 17, an output interface 18, and a bus 19 connecting them.

The ROM 11 stores the programs to be executed by the CPU 12.

The RAM 13 is a main memory for executing a variety of operations in the CPU 12. Further, the RAM 13 stores a data recording table in which are recorded addresses and capacities of the data recorded in the mass storage 17 at the start of a series of processings.

The external control interface 14 is an interface with the transmission controller 50. The CPU 12 executes a variety of processings based on commands from this transmission controller 50.

The input interface 15 is an interface receiving program data from the switcher 40. The input program data is once stored in the RAM 13 and then recorded in the mass storage 17 via the buffer memory unit 16. Note that, an input I/F 15 can also directly perform the transfer of data with the buffer memory unit 16. Accordingly, it is also possible to directly record the input program data in the mass storage 17 via the buffer memory unit 16.

The mass storage 17 is a data storage device which is constituted by a hard disc device, a magneto-optic disc (MO) device, etc., has a large capacity, and can perform random access. The mass storage 17 is controlled by a mass storage interface unit 31 in the buffer memory unit 16.

The buffer memory unit 16 temporarily stores the transfer data at the time of transfer of the program data with the mass storage 17, the input interface 15, the output interface 18, and the bus 19. The buffer memory unit 16 is constituted by the mass storage interface unit 31, n number of buffer memory controllers $32_{-1}$ to $32_{-n}$, and the buffer memories $33_{-1}$ to $33_{-n}$ corresponding to the buffer memory controllers $32_{-1}$ to $32_{-n}$.

The mass storage interface unit 31 is a control unit for controlling the mass storage 17.

The buffer memory controllers $32_{-1}$ to $32_{-n}$ separate the program data read out together every predetermined unit from the mass storage 17 to the data for each channel based on the control signal from the CPU 12 in association with the mass storage interface unit 31, stores the same in the buffer memories $33_{-1}$ to $33_{-n}$, and appropriately outputs the same to the output interface 18.

The buffer memories $33_{-1}$ to $33_{-n}$ are buffers provided corresponding to the n number of output channels and temporarily store the data for each channel read out from the mass storage 17 and separated.

The output interface 18 is an interface which transfers the program data output from the mass storage 17 via the buffer memory 16 to the formatter unit 20 and is constituted by the output interfaces $35_{-1}$ to $35_{-n}$ corresponding to the n number of output channels and an output control unit 34 for controlling the same.

The bus 19 is a data bus for performing the transfer of the data of the different unit in the transmission unit 10. For example, the data transfer between the CPU 12 and the RAM 13, the transfer of the data input to the input I/F 15 to the RAM 13, the transfer of the data from RAM 13 to the buffer memory unit 16, etc. are carried out via this bus 19.

The CPU 12 makes the input interface 15, the buffer memory unit 16, and the output interface 18 execute a variety of commands based on a command from the transmission controller 50 in accordance with a program stored in the ROM 11. The operation of the CPU 12 will be explained in detail later.

Next, an explanation will be made of the recording format of the program data in the data transmission apparatus 1 of the first embodiment.

Figure 4:
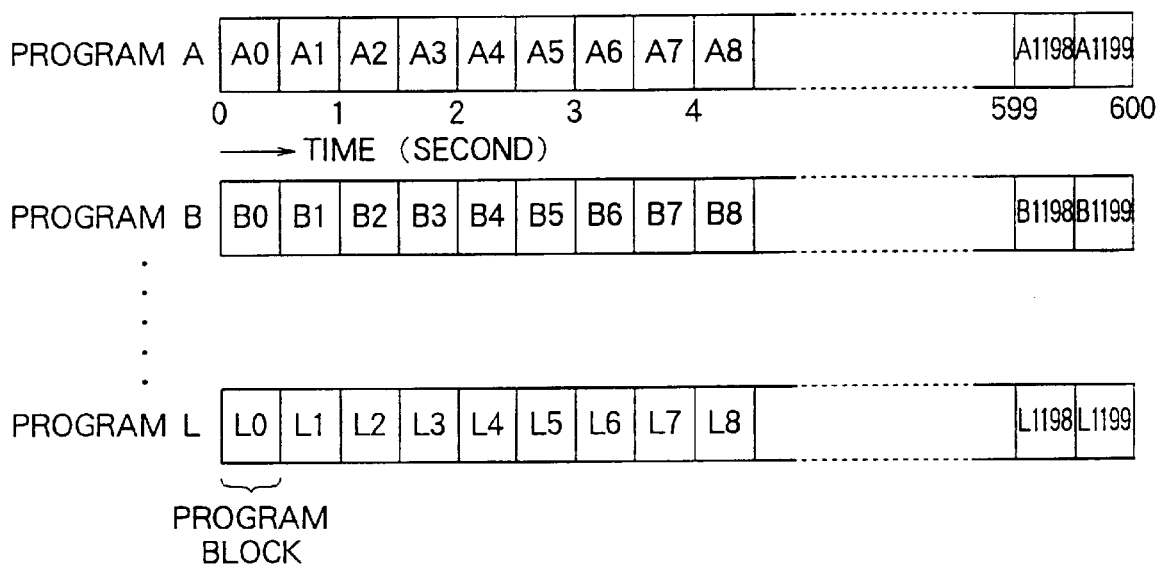
FIG. 4 is a view explaining program data recorded in the data transmission apparatus shown in FIG. 1.

The data transmission apparatus 1 of the first embodiment records the program data of the program A to program L shown in FIG. 4 by a data format suited for NVOD transmission.

In FIG. 4, each of the 12 programs A to L is comprised of video data lasting 10 minutes. They are respectively comprised by 0.5 second program blocks A0 to A1199, B0 to B1199, . . . , and L0 to L1199.

Figure 5A:
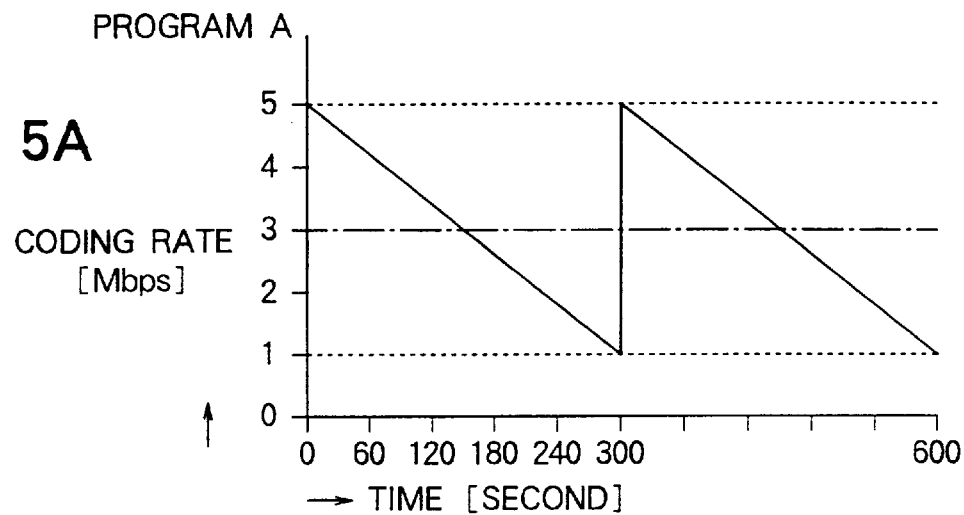
FIG. 5A is a view of the change along with time of the variable length coding rate of a program A.
Figure 5B:
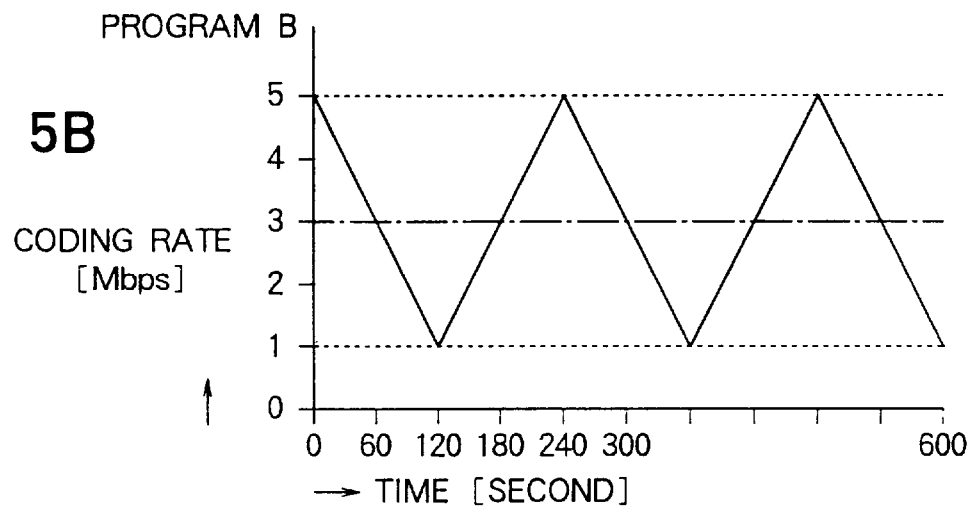
FIG. 5B is a view of the change along with time of the variable length coding rate of a program B.
Figure 5C:
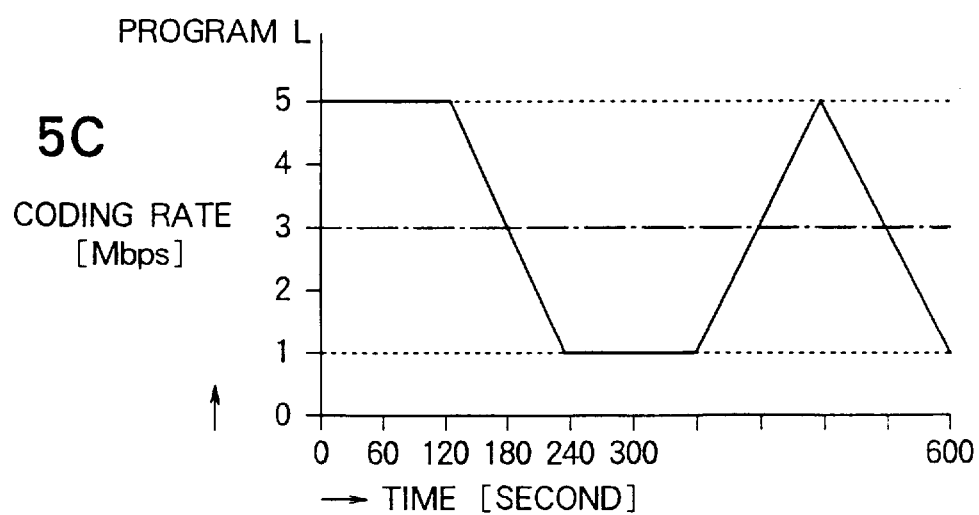
FIG. 5C is a view of the change along with time of the variable length coding rate of a program C.

The change of the coding rate of the program A, program B, and program L is shown in FIG. 5. Note that, in FIG. 5, the coding rate is represented by the amount of coded data when encoding one second of video data (video data of amount of 30 frames in an NTSC signal). In FIG. 5, each program has an average coding rate of 3 [Mbps], a maximum coding rate of 5 [Mbps], and a minimum coding rate of 1 [Mbps]. However, for example in the program A, it exceeds 3 [Mbps] for the period from 0 to 150 seconds and for the period from 300 to 450 seconds and is less than 3 [Mbps] for the period from 150 to 300 seconds and for the period from 450 to 600 seconds. In such a program, where the video data is encoded with a fixed coding rate of 3 [Mbps], the quality of the picture will be deteriorated during the period from 0 to 150 seconds and the period from 300 to 450 seconds and the coding efficiency will be poor and the recording medium will be wastefully used for the period from 150 to 300 seconds and for the period from 450 to 600 seconds.

Accordingly, in the data transmission apparatus 1 of the first embodiment, to prevent the deterioration of the quality of the picture and to utilize the recording medium with a high efficiency, data comprised of the program data subjected to variable length coding is recorded. The state of recording is shown in FIG. 6.

FIG. 6 is a view of the state of recording of the program data to the mass storage 17 in the data transmission apparatus 1 of the first embodiment as mentioned before. As shown in FIG. 6, in the data transmission apparatus 1 of the first embodiment, the input program data is recorded so that the data blocks to be simultaneously reproduced of the 12 series of program data subjected to the variable length coding are continuous on the recording medium to result in preferable for NVOD transmission. Concretely, the series of program data, each comprised by 1200 program blocks, are recorded from the logical sector address 1000 in an order of A0 to L0, A1 to L1, . . . , A1199 to L1199.

Further, in the data transmission apparatus 1 of the first embodiment, to reproduce the recording data as shown in FIG. 6, the data recording table shown in FIG. 7 is prepared. The data is reproduced by referring to this table. In the data recording table of FIG. 7, a start logic sector address, a total number of sectors, the numbers of sectors of the programs A to L, and the amounts of codes of the programs A to L are recorded for every 1200 program blocks. This data recording table is stored in a predetermined region of the mass storage 17 before the address 1000. At the time of reproduction, first, the CPU 12 of the transmitter 10$_{-1}$ reads this table onto the RAM 13 and thereafter sequentially reads the data and instructs the transfer referring to this data recording table.

Next, an explanation will be made referring to FIG. 8 to FIG. 13 of the operation of the data transmission apparatus 1 of the first embodiment for recording the input program data by the recording formatter as mentioned before and reproducing the program data recorded in this way.

First, an explanation will be made of the method of recording the data input to the data transmitting apparatus 1 in the mass storage 17 of the transmitter 10$_{-1}$ (i=1 to n).

Figure 8:
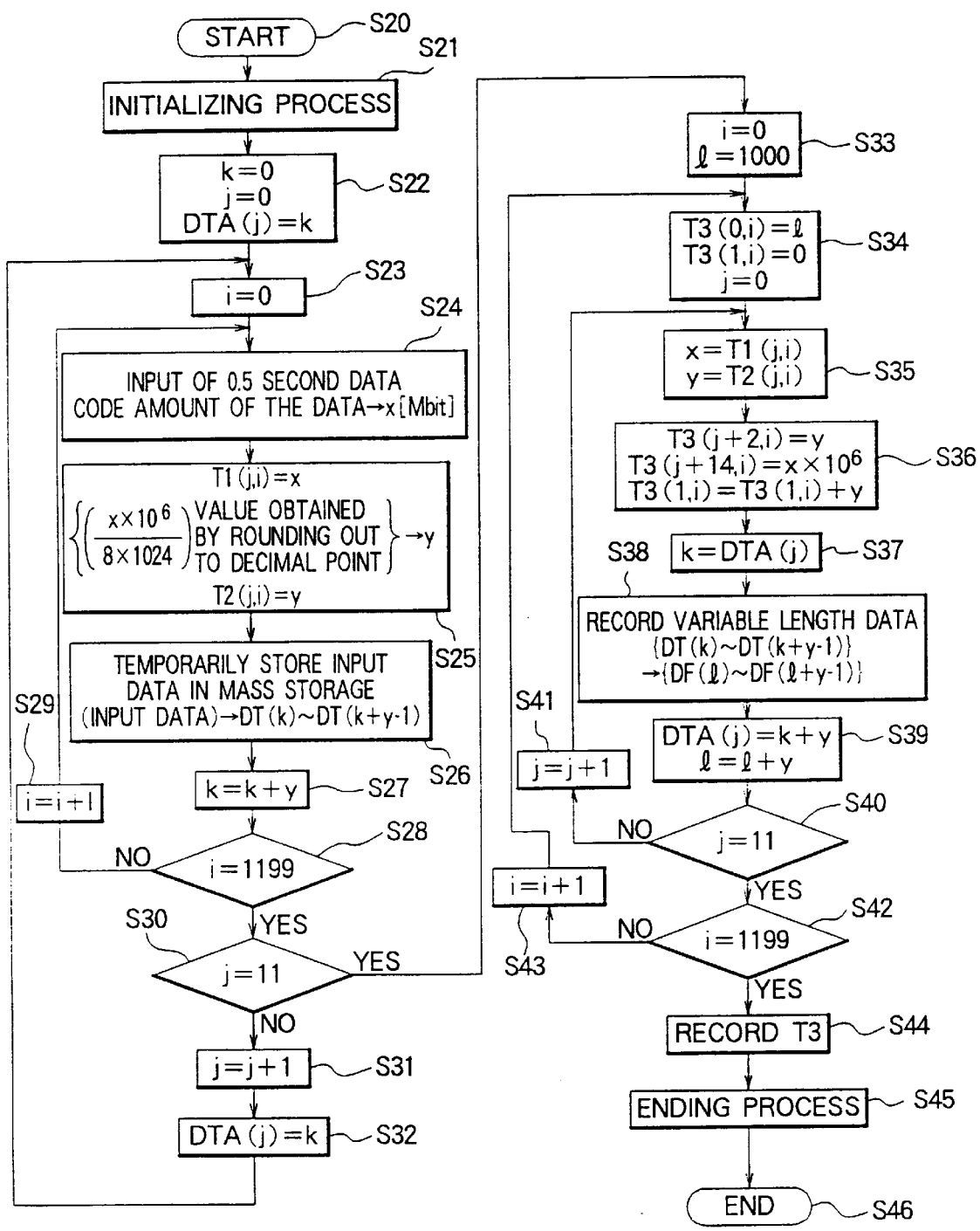
FIG. 8 is a flow chart showing the processing of a CPU of the transmission unit at the time of recording data.

FIG. 8 is a flow chart showing the processing of the CPU 12 of the transmitter 10$_{-1}$ when recording the data.

Note that, in FIG. 8, the array Ti is an array for recording the amount of coding data of the data for every 0.5 second of each program data and is comprised of 12×1200 elements. Further, the array T2 is an array for recording the number of sectors of the data for every 0.5 second of each program data and is comprised of 12×1200 elements. Further, the array T3 is an array for recording the above data recording table and is comprised of 12×1200 elements. Further, the array DT and the array DF are arrays for showing the data recording regions of the mass storage 17, in which the array DT shows a data file for temporarily recording the program data and the array DF shows the data file for finally recording the program data. Further, the array DTA is a pointer for designating the start sector address of the above 12 programs in the data file DT and is comprised of 12 elements corresponding to the 12 series of program data.

First, when starting the processing for recording data (step S20), the CPU 12 of the transmitter 10$_{-1}$ (i=1 to n) performs initialization processing (step S21). This initialization processing includes for example processing for opening the file in the mass storage 17 for recording the data or securing the array etc. on RAM 13. Next, the variable k showing the data recording sector address of the data file DT, the variable j showing the type of program, and the array DTA are initialized (step S22). Specifically, the variables k and j are made 0 and the array DTA(j) is made k, i.e., 0.

Further, the variable i, which is the pointer of 1200 data for every 0.5 second of each program, is reset (step S23) and the input of the program data is started.

First, the data for the first 0.5 second of the first program data is input and the code amount x of that data is found (step S24). Note that the input data is stored in the RAM 13 at this point of time. Next, the found code amount x is recorded at a predetermined element of the array T1, that is, an array element T1(0,0) for the first data of the first program. Further, the number y of sectors of the mass storage 17 necessary when recording that data is found and is recorded at a predetermined element of the array T2, that is, an array element T2(0,0) for the first data of the first program (step S25). Specifically, a value obtained by rounding off the result of the computation (X×10$^6$)÷(8×1024) to the decimal point is used as the number y of sectors.

When the detection of the code amount and necessary number of sectors with respect to the data for the first 0.5 second of the first program data is ended, that data is temporarily recorded in the mass storage 17 (step S26). Namely, the data of the amount of 0.5 second, that is, the data of the amount of y number of sectors, is recorded in the recording region of the (k+y−1) sectors from the sector address k of the data file DT (actually existing in the mass storage 17). When recording the data in the mass storage 17, the pointer k is counted up by the amount of y number of sectors so that the pointer k indicates the sector address at which the data will be recorded next (step S27).

Next, it is examined whether or not the data of the currently input program j is ended. Namely, it is judged whether or not the data for every 0.5 second of the first program has been input 1199 number of times, in other words, whether or not all of the data of 10 minutes of the first program data has been input (step S28). If the data of that program has not yet ended, the pointer i of the data of every 0.5 second is counted up by 1 (step S29) and the processings from step S24 are repeated again.

When the data of the currently input program j has ended at step S28, it is checked whether or not all of the 12 programs to be input have been input, that is, whether or not the variable j indicating the type of the program is 11 (step S30). If the input of the data of 12 programs has not ended, the variable j indicating the type of that program is counted up (step S31), and further the sector address k on the mass storage 17 at which the data will be recorded next is set in the array DTA showing the head address of each program of the temporary data file DT (step S32), and the input of the data of a new program j is repeated. Namely, at step S23 again, the variable i indicating the identification number of the data of each program is reset, the processings from step S24 to step S28 are repeated, and all data of the 10 minutes of that program are input.

When it is judged that the scheduled 12 series of program data are all input at step S30, the processing routine shifts to the processing for the rearrangement of the data from step S33. Note that, in this state, all data are recorded in the array T1 and the array T2. The content of the array T1 where the 12 series of program data shown in FIG. 4 and FIG. 5 are input is shown in FIG. 9. The content of the array T2 is shown in FIG. 10. FIG. 9 is a table showing the amount of coding data of each data for every 0.5 second of each program data, while FIG. 10 is a table showing the number of sectors necessary when recording the data in the mass storage 17.

Next, an explanation will be made of the processing for the rearrangement of the data. Note that, the table stored in the array T3 at the end of the present rearrangement processing is the data recording table shown in FIG. 7 used in the processing of reading the recorded program data.

In the processing for rearrangement, the processing is proceeded with using as a reference the number of the data blocks for every 0.5 second. First, the variable i indicating the identification number of the data block is reset, then the head address of the region recording the program data in the mass storage 17 is set to a variable l for the initialization (step S33). For the above head address, it is possible to set any address so as to record the data in any recording region, but in the first embodiment, a recording region for recording the data such as the data recording table etc. is secured and 1000 is set as the head address at which that program data is recorded. Namely, the data of the data recording table etc. is recorded in the recording region before the sector address 1000 and the program data is recorded in the recording regions of the sector address 1000 and subsequent addresses.

Next, as the initialization performed at the transfer of the first data of each data block, the head sector address of the recording region in which the data of the data block i is recorded is set in the array element T3(0,i), and the array element T3(1,1) in which the total number of sectors of all programs of that data block is recorded and the variable j indicating the program are reset (step S34). For the first data block, the above initially set sector address 1000 is set in the array element T3(0,0).

Then, the data of each program j of that data block is sequentially transferred. First, the amount of the coding data and required number of sectors of the first data block of the first program are read from the array T1 and the array T2 and set to the variables x and y, respectively (step S35). Specifically, first, the amount of coding data for the first 0.5 second of the program A is read from the array T1 in which a value as shown in FIG. 9 is recorded and the value 2500 thereof is set to the variable x. Further, the number of sectors of the recording region necessary for the data of the first 0.5 second of the program A is read from the array T2 in which a value as shown in FIG. 10 is recorded and a value 306 thereof is set to the variable y.

Next, the read amount of coding data and number of sectors are set in the predetermined array elements $T3(j+14,i)$ and $T3(j+2,i)$ of the array T3, respectively, and further the above number y of sectors is added to the value of the array element $T3(1,i)$ in which the total number of sectors of all programs of that data block i is recorded (step S36). For the first data of the first program, 2500000 is set in the array element $T3(14,0)$ and 306 is set in the array element $T3(2,0)$. First, at the point of time when the first program data is recorded, the value 306 of the variable y is set as it is also in the array element $T3(1,i)$ in which the total number of sectors of all programs is recorded.

Next, the head address $DTA(j)$ of the data of the data block i of the program j in the data file DT is read and set in the pointer k (step S37). Then, based on that pointer k, the data is read from the data file DT and transferred to the predetermined region of the data file DF, the head address of which is indicated by the variable l (step S38). When the transfer of that data is ended, the number y of sectors of the currently transferred data is added to the read head address $DTA(j)$ of the data file DT and the pointer l of the data file DF and respective values are updated (step S39). At the point of time when the first data of the first program is transferred, the pointer l is updated to 1306 (1000+306).

The processings from step S35 to step S39 are sequentially carried out for the respective programs. Namely, it is checked whether or not the transfer of the data of the data block i of all programs is ended (step S40). Where it has not ended, the variable j indicating that program is counted up (step S41) and the processings from step S35 are repeated.

At the second round, at step S35, the amount of coding data and required number of sectors of the first data block of the second program are read out from the array T and array T2 and set to the reading variables x and y. As shown in FIG. 9 and FIG. 10, 2500 is set as the variable x and 306 is set as the variable y. Then, at step S36, these values are respectively set in the predetermined array elements $T3(15,0)$ and $T3(3,0)$ of the array T3. Further, the above number y of sectors is added to the value of the array element $T3(1,0)$ in which the total number of sectors of all programs of that data block i is recorded. In this array element $T3(1,0)$, the number 306 of sectors of the first program has been already set, so the value of the array element $T3(1,i)$ becomes 612 by this processing.

Then, the head address $DTA(j)$ of the data of the first data block of the second program of the data file DT is read and set in the pointer k (step S37). Based on the pointer k and the pointer l of the data file DF, the data of an amount of y number of sectors starting from the sector address k of the data file DT is transferred to the region of the amount of y number of sectors starting from the sector address l of the data file DF.

Then, the number y of sectors of the currently transferred data is added to the head address $DTA(j)$ of the data file DT and the pointer l of the data file DF to update those values (step S39).

Below, the processing from step S35 to step S39 is repeated in a similar fashion for exactly the number of series of the program data. Then, when the transfer of the final program data is ended (step S40), the transfer of the data of the next 0.5 second is started. Namely, it is checked whether or not the data block i for which the transfer of the current data is ended is the final data block, that is, the 1200-th data block (step S42). Where it is not the final data block, the variable i indicating the data block is increased by 1 (step S42) and the processing for the transfer of the program data is commenced with respect to the next data block. Namely, the processing from step S34 to step S41 is repeated.

At step S34 again, the head sector address of the recording region in which the data of that data block i is recorded is set in the array element $T3(0,i)$, and the array element $T3(1,i)$ in which the total number of sectors of all programs of that data block is recorded and the variable j indicating a program are reset (step S34). The total number of sectors of the data of the first 0.5 second of the 12 programs is 2951 sectors as seen from the table of FIG. 7. Accordingly, at the point of time when the transfer of this data is ended, the pointer Q of the data file DF has become 3951, that is, is advanced from the initial value 1000 of that address by 2951 sectors. This value is set in the array element $T3(0,1)$ as the head address of the recording region in which the data of the second data block (i=1) is recorded.

Thereafter, the processing from step S35 to step S41 is repeated in a similar fashion to transfer the respective program data. Further, the processing from step S34 to step S43 is repeated to transfer the data of the respective data blocks.

Then, at step S42, when the transfer of the data of the programs of the final data block, that is, the data block having a data block identification number i of 1199, is ended, the array T3 is written in the mass storage 17 as the data recording table (step S44), the processing for ending the series of processings for recording the data is carried out (step S45), and the processing is ended (step S46). Note that, this processing for ending is processing for closing the file in the mass storage 17 in which the data is recorded or opening the region on the RAM 13.

By writing the data by performing such processing, the data can be recorded in the mass storage 17 in the form as shown in FIG. 6. Further, the data recording table as shown in FIG. 7 can be obtained.

Next, an explanation will be made of the method of reading the program data recorded in the mass storage 17 with the format as shown in FIG. 6 and transmitting the same.

Figure 11:
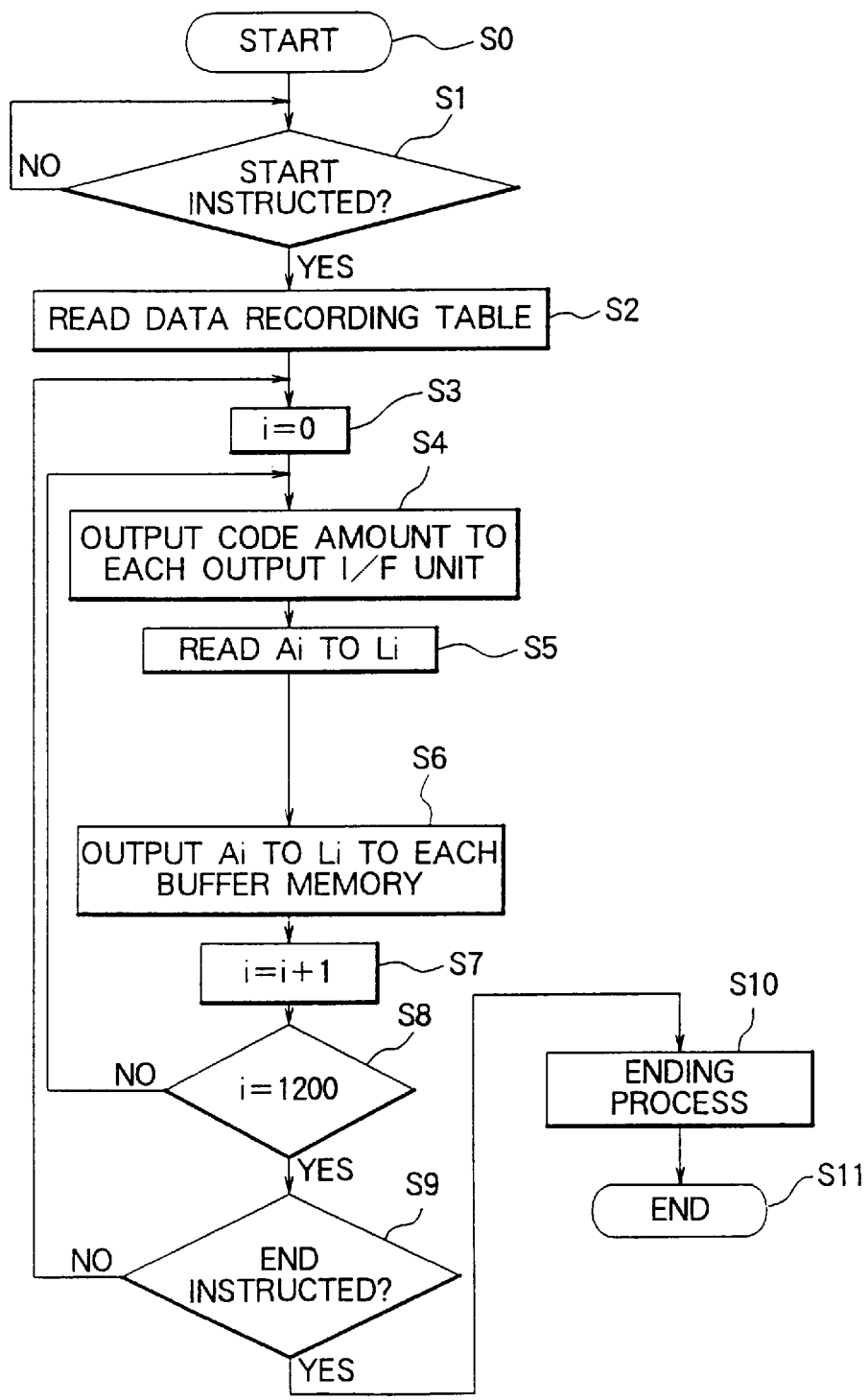
FIG. 11 is a flow chart showing the processing of the CPU of the transmission unit at the time of transmission of data in a first embodiment of the data transmission apparatus.

FIG. 11 is a flow chart showing the processing of the CPU 12 at the time of transmission of the data.

First, when receiving an instruction for starting the transmission of the data from the transmission controller 50 via the external control interface 14 (step Sl), the CPU 12 reads the data recording table from the mass storage 17 and stores the same in the RAM 12 (step S2). Next, 0 is set as the initial value of the block identification number i (step S3) and the code amounts of the programs of the block 0 are read from the data recording table and output to the output interfaces $35_{-1}$ to $35_{-n}$ (step S4).

Next, based on the total number of sectors of the data recording table, the data of the block 0 is read from the mass storage 17 (step S5). Then, the number of sectors of each program is read from the data recording table and set in the mass storage interface unit 31 and the buffer memory controllers $32_{-1}$ to $32_{-n}$. The data of the programs are stored separated in the buffer memories $33_{-3}$ to $33_{-n}$ based on the number of sectors for each program (step S6). By this processing, the program data is appropriately transmitted for every output channel.

After this, the block identification number is increased by one (step S7). The processings from step S4 to step S8 are repeated until the block identification number reaches 1200 (step S8). When the data up to the block 1200 is transmitted, it is judged whether or not the transmission should be repeatedly carried out (step S9). Where it should be repeated, the processings from step S3 are repeated again. Where it is allowed to end the transmission of the data, the processing for ending the routine carried out (step S10) and the processing is ended (step S11).

Figure 12:
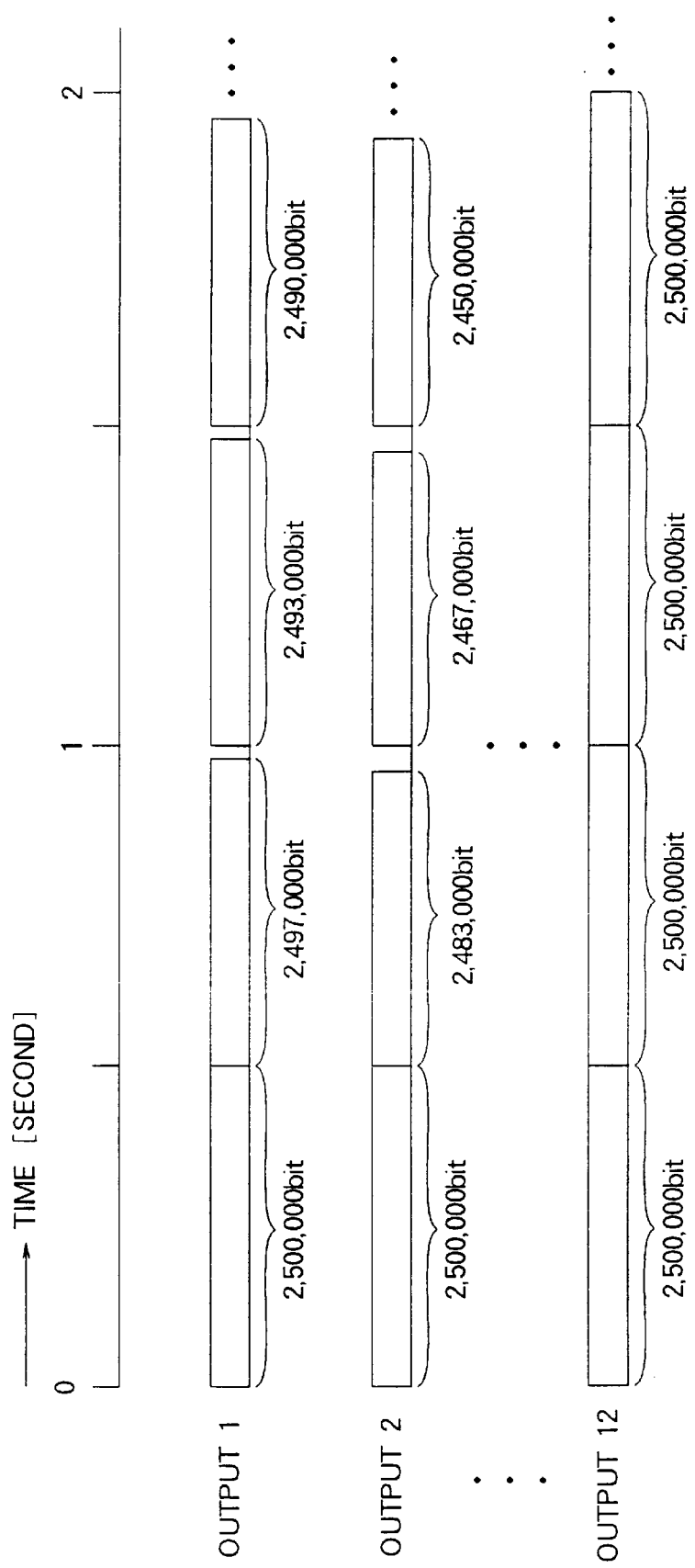
FIG. 12 is a view of the data output from the first embodiment of the data transmission apparatus and a view of the output of the variable data rate from each output channel.

By performing the above processing, the data coded with the variable data rate as shown in FIG. 12 are output from the output channels of the transmitter $10_{-1}$.

Note that, in the example shown in the first embodiment, since transmission data of a maximum 5 [Mbps]×12 channels will be recuested, the mass storage 17 should be a data recording apparatus with a reproduction capability of at least 60 [Mbps].

The state of the program transmitted by such processing is shown in FIG. 13. FIG. 13A shows the state where 12 programs of 10 minutes length are repeatedly transmitted. Further, FIG. 13B shows a state where one program of 120 minutes is transmitted in 12 states deviated by 10 minutes each. By controlling the correspondence between the read data and output channels at the stage of repeating the transmission of data of 10 minutes length corresponding to the transmission of 1200 program blocks, both of the transmission methods shown in FIG. 13A and 13B can be realized.

In this way, according to the data transmission apparatus of the present invention, even if the data is video data coded with a variable length rate, a desired data can be adequately output to the desired output channel. Accordingly, the video data can be recorded at coding rates adapted to individual video data. Thus the deterioration of the quality of the picture can be prevented and, at the same time, efficient recording of video data becomes possible.

Second embodiment

The data transmission apparatus of the first embodiment can handle data coded with a variable length rate, but of course the present invention can also be applied even in a case where transmission of a predetermined fixed length is constantly requested due to conditions of the transmission system etc. A data transmission apparatus in the case of using the present invention for transfer at a fixed data length will be explained as a second embodiment.

The configuration of the second embodiment of the data transmission apparatus, the recording format of the data, the method of preparation of the data recording table, the format of the data recording table, etc. are all the same as those of the first embodiment of the data transmission apparatus.

In the second embodiment of the data transmission apparatus, the method of reading the program data recorded in the mass storage 17 and transmitting the same is different from the first embodiment of the data transmission apparatus. This method of transmission of the data will be explained referring to FIG. 14 and FIG. 15.

Figure 14:
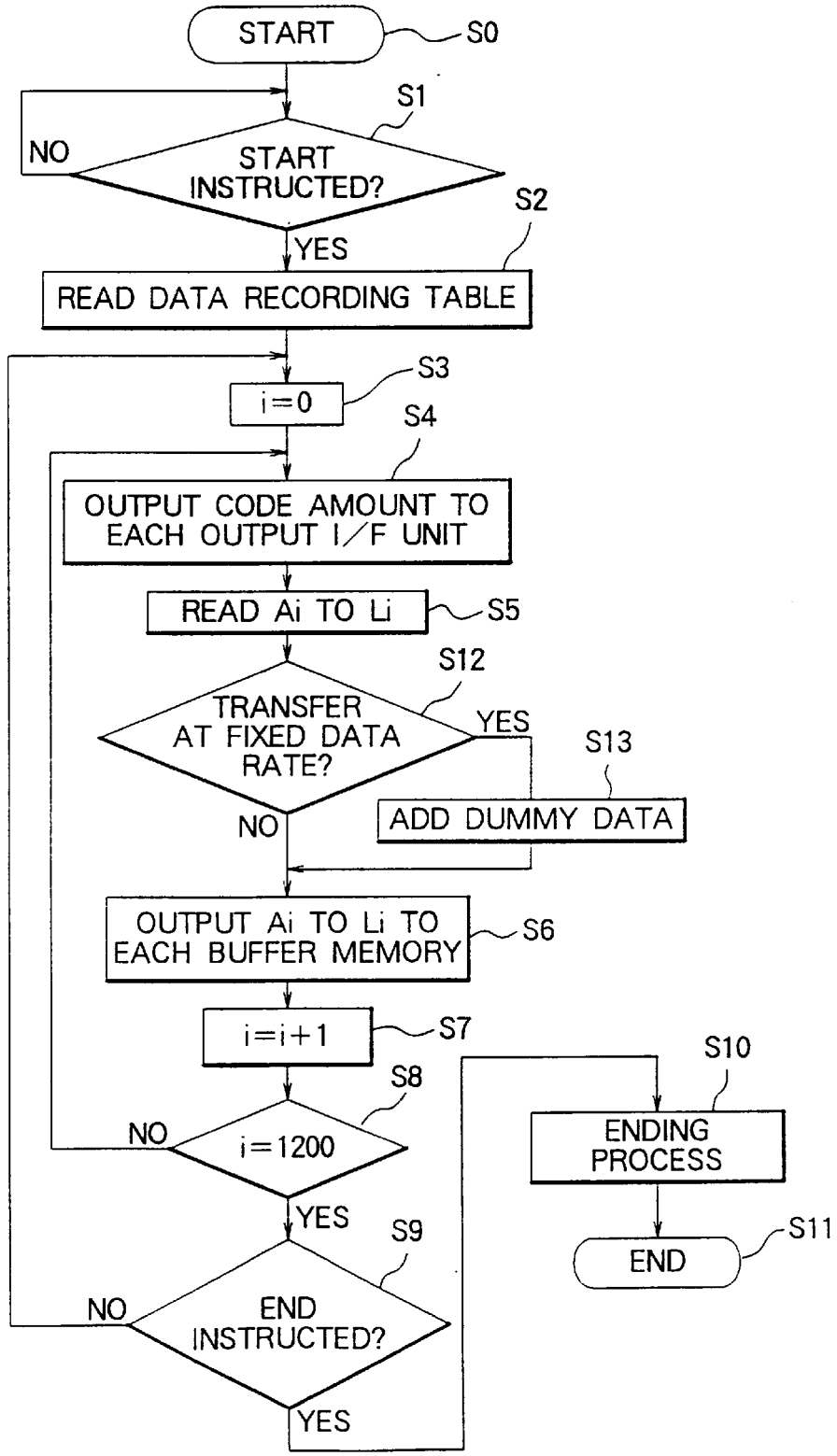
FIG. 14 is a flow chart showing the processing of the CPU of the transmission unit at the time of transmission of data in a second embodiment of the data transmission apparatus.
Figure 15:
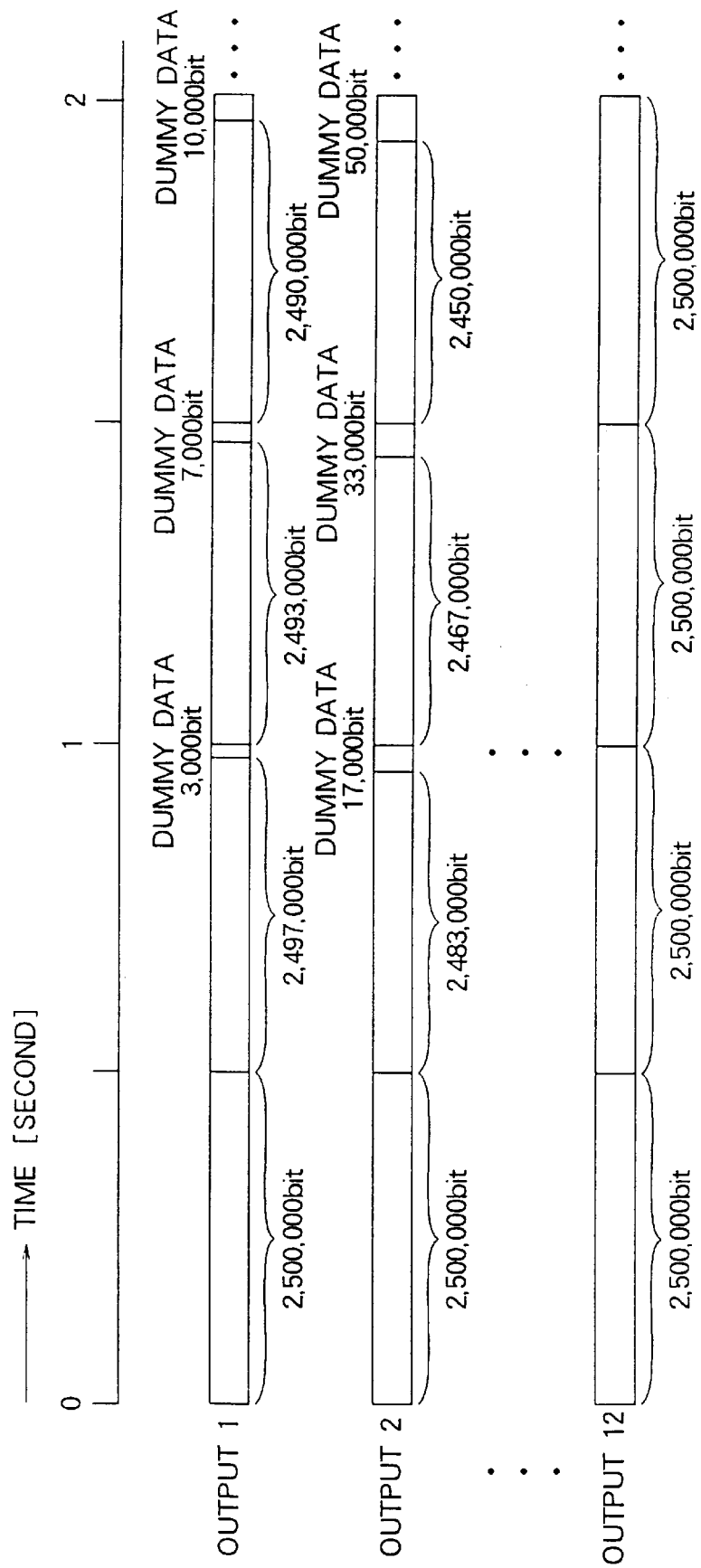
FIG. 15 is a view of the data output from the second embodiment of the data transmission apparatus and a view of the output of the fixed data rate from each output channel.

FIG. 14 is a flow chart showing the processing of the CPU of the transmission unit at the time of transmission of data in the second embodiment of the data transmission apparatus; and FIG. 15 is a view of the data output from the second embodiment of the data transmission apparatus.

As shown in FIG. 14, in the second embodiment of the data transmission apparatus as well, first, similar to the first embodiment of the data transmission apparatus, when the processing for transmission of data is instructed (step S1), the data recording table is read from the mass storage 17 (step S2) and the block identification number i is reset (step S3). Then, the code amounts of the programs of that block 0 are read from the data recording table and output to the output interfaces $35_{-1}$ to $35_{-n}$ (step S4) and the data of the block 0 is read from the mass storage 17 based on the total number of sectors of the data recording table (step S5).

After reading this data, in the second embodiment of the data transmission apparatus, it is decided whether or not the transmission is by a variable data rate or the transmission is by a fixed data rate (step S12). Where it is transmission by a fixed data rate, dummy data is added so that the data of each program has a predetermined data amount (step S13). Where it is transmission by a variable data rate at step S12, the addition of the dummy data is not carried out. Then, the program data are separated and stored in the buffer memories $33_{-1}$ to $33_{-n}$ (step S6), and the program data are appropriately transmitted to the output channels by this.

Thereafter, the processings from step S7 to step S11 are carried out in a similar fashion as the first embodiment.

By performing the above processings, dummy data is added to the output of an amount of data smaller than the output of the maximum amount of data so that data adjusted to the fixed data rate is output from the output channels of the transmitters $10_{-1}$ as shown in FIG. 15.

The present invention can in this way be applied also to a data transmission apparatus for transmitting data to a transmission line performing transmission with a fixed data rate.

Note that the present invention is not restricted to the first embodiment and second embodiment. A variety of modifications are possible.

For example, the configuration of the data recording table is not restricted to the form shown in FIG. 7.

Further, in the above embodiments, the explanation was made of a method of preparing the data recording table in the data transmission apparatus at the time of inputting the program data. However, it is also possible to input a prepared data recording table from the outside as this data recording table at the time of input of the program data.

Further, it is also possible to record the code amount of each program block recorded in the data recording table at the head of the actual variable length data and to have the output interfaces $35_{-1}$ to $35_{-n}$ determine the code amount by reading the head data.

As explained above in the first embodiment and the second embodiment, according to the data transmission apparatus of the present invention, it becomes possible to read data at a high speed from a recording apparatus in which are recorded video data and audio data which have been coded with a variable data rate. As a result, it becomes possible to record data in the recording apparatus with a high efficiency and provide a data transmission apparatus which does not cause deterioration of the quality of the video data etc.

INDUSTRIAL APPLICABILITY

The data transmission apparatus of the present invention can be applied to a data transmission apparatus used in a video-on-demand (VOD) system and a near video-on-demand (NVOD) system.

I claim:

1. A data transmission apparatus comprising:

a data recording means for recording desired data on a recording medium in blocks;

a data recording control means for controlling said data recording means to record a plurality of divided time series data, formed by dividing the time series data for every predetermined time zone and applying variable length coding, so that the divided time series data of continuous time zones are recorded in a same block or continuous blocks of the recording medium in the order of the time zones;

a table storing means for storing at least a table including data length information indicating the data length of each of the divided time series data and recording address information indicating a first recording address of the divided time series data in the data recording means; and an output means for sequentially reproducing said divided time series data and outputting said divided time series data in a predetermined fixed time unit based on the data length information and the recording address information stored in the table storing means.

2. The data transmission apparatus as set forth in claim 1, wherein the time series data is video data.

3. A data transmission apparatus as set forth in claim 1, wherein the data recording means and the table storing means store the data and the table in different recording regions of the same recording medium.

4. A data transmission apparatus comprising:

a data recording means for recording on a recording medium a plurality of divided time series data, formed by dividing a plurality of time series data for every predetermined time zone and applying variable length coding, in order in accordance with the time zones of the plurality of divided time series data of each time series data, respectively;

a table storing means for storing at least a table including data length information indicating the data length of each of the divided time series data and recording address information indicating the first recording address of at least one divided time series data in the data recording means;

a plurality of output channels; and an output means for sequentially outputting the divided time series data from one of the plurality of output channels in a predetermined fixed time unit based on the data length information and the recording address information stored in the table storing means.

5. A data transmission apparatus as set forth in claim 4, wherein the plurality of time series data have a mutual relationship in time series, the output means sequentially outputs the plurality of time series data from each of the output channels in a predetermined order by sequentially outputting a plurality of divided time series data constituting the plurality of time series data from each of the output channels in the predetermined order.

6. A data transmission apparatus as set forth in claim 4, wherein the plurality of time series data have a mutual relationship in time series and, each time series data corresponds to one of the output channels, and the output means sequentially outputs a plurality of divided time series data constituting each time series data from each corresponding output channel in a predetermined order.

7. A data transmission apparatus as set forth in claim 4, wherein the data recording means records each divided time series data of the same time zone among the plurality of time series data in the recording medium so that they are physically continuous.

8. A data transmission apparatus as set forth in claim 4, wherein the data recording means continuously records the each of the divided time series data of the same time zone among the plurality of time series data in recording regions from which the data can be read in a lump on a randomly accessible recording medium.

9. A data transmission apparatus as set forth in claim 4, wherein the time series data is video data.

10. A data transmission apparatus as set forth in claim 4, wherein the output means has a data reading means for reading from the data recording means each of the divided time series data by identifying the same for every time zone based on the data length information and the recording address information stored in the table storing means;

a plurality of buffer memories which are provided corresponding to the time series data for storing each of the divided time series data read by the data reading means, respectively; and a control means for controlling the output of the data from the plurality of buffer memories to the plurality of output channels.

11. A data transmission apparatus as set forth in claim 4, wherein the data recording means and the table storing means store the data and the table in different recording regions of the same recording medium.

* * * * *